US 6,738,337 B2

(12) United States Patent
Xu et al.

(10) Patent No.: US 6,738,337 B2
(45) Date of Patent: May 18, 2004

(54) ONLY-READABLE THREE-DIMENSIONAL OPTICAL STORAGE DEVICE

(75) Inventors: Jingjun Xu, Tianjin (CN); Qian Sun, Tianjin (CN); Xinzheng Zhang, Tianjin (CN); Hui Huang, Tianjin (CN); Qiang Wu, Tianjin (CN); Baiquan Tang, Tianjin (CN); Haijun Qiao, Tianjin (CN); Guangyin Zhang, Tianjin (CN); Zuojin Sha, Tianjin (CN)

(73) Assignee: Nankai University, Tianjin (CN)

( * ) Notice: Subject to any disclaimer, the term of this patent is extended or adjusted under 35 U.S.C. 154(b) by 578 days.

(21) Appl. No.: 09/875,947

(22) Filed: Jun. 8, 2001

(65) Prior Publication Data

US 2002/0018429 A1 Feb. 14, 2002

(30) Foreign Application Priority Data

Jul. 20, 2000 (CN) ........................................ 00121095 A

(51) Int. Cl.$^7$ ................................................. G11B 7/00
(52) U.S. Cl. ................................... 369/103; 369/112.22
(58) Field of Search ............................. 369/103, 275.3, 369/112.01, 112.22

(56) References Cited

U.S. PATENT DOCUMENTS 5,943,145 A * 8/1999 Curtis et al. .................. 359/22

OTHER PUBLICATIONS

"Multilayer volume holographic optical memory" Vladimir Markov et al., Feb. 15, 1999 / vol. 24, No. 4 / Optics Letters, pp. 265–267.

"Digital wavelength–multiplexed holographic data storage system" David Lande et al., Optics Letters / vol. 21, No. 21 / Nov. 1, 1996, pp. 1780–1782.

* cited by examiner

*Primary Examiner*—Nabil Hindi
(74) *Attorney, Agent, or Firm*—Rader, Fishman & Grauer PLLC

(57) ABSTRACT

The invention relates to the information storage. It consists of a computer, a precise rotary table, a writing laser source, a readout laser source, a spatial filter, a spatial light modulator, lens, mirrors, photorefractive crystals (such as doubly doped lithium niobate), and a phase-mismatch adjustor; Due to used a green light (532 nm) as the writing light, and a red light (670 nm) as the readout light, the signal-to-noise ratio is improved greatly and the problem of fixing the stored information is solved. The transmission configuration is used to realize the high-density digital storage in which the irregular lens is designed to work as a phase-mismatch adjustor and read out the whole stored image with no distortion and loss. The dynamically differential encoding and decoding technique is used to suppress the bit-error-rate to lower than $10^{-6}$.

6 Claims, 1 Drawing Sheet

ONLY-READABLE THREE-DIMENSIONAL OPTICAL STORAGE DEVICE

TECHNICAL FIELD

The invention relates to the field of the information storage.

BACKGROUND ART

At present, most of storage devices, such as magnetic discs, compact discs, etc., record data in a two-dimensional manner, with a lower storage capacity being from about 10 GB up to about 35 GB and a slower access rate being not more than 1 MB/s, so as to be not by far able to satisfy the needs for information storage, information transmission, and information processing in the future. The data storage of a high density has been all along an indispensable key field in the development of the information technology and the computer technology. By the year of 2005 when the network of new kind and the multimedia of third generation appear, for any computer, at least 100 GB of the external storage capacity and at least 40 MBps of the data transfer rate will be demanded. But unfortunately, existing various kinds of external storage devices can not satisfy these demands, even DVD compact disc systems which have just entered markets are far away from this object. The only way solving these problems is to use new principles, new technologies, and new materials in order to develop a storage technology and system of a new generation having a high density and a high speed.

The three-dimensional storage technology based on the holographic storage have a number of good properties such as a large capacity of data storage, a short access time and a high data transfer rate. The three-dimensional holographic storage technology records and read information as two-dimensional holographic pages, and data are record in parallel through the volume of the crystal rather than localized on a surface or thin film as in traditional storage. In this way, a high-density (in the order of $10^{13}$ bit/cm$^3$ or greater) information storage could be realized by this kind of three-dimensional optical storage, with a high data transfer rate being equal or more than $10^9$ bits/s and a readout time for one data page (up to $10^6$ bits per page) being smaller than 100 μs. At present, however, in many prior three-dimensional storage configurations, so called 90°-configuration is widely used and the green light is used as the readout beam. Therefore it is difficult to guarantee against the fixing time and it is not ease to miniature the system.

DISCLOSURE OF THE INVENTION

An object of the invention is to provide a three-dimensional optical storage systems, which could realize a high-density information storage with a short writing and read access time, and to resolve the problem of the information fixing time to meet the ever-increasing need for the information storage of multimedia data and to adapt to the future need of a high-speed information development.

The only-readable three-dimensional optical storage of the invention consists of two systems: one is the writing system which includes a computer, a beam splitter, a precise rotary table, a light-source for writing, lenses, a spatial light modulator, a spatial filter, mirrors, a photorefractive crystal (such as doped or doubly doped LiNbO$_3$ or LiTaO$_3$) and a charge-coupled device (CCD); another one is the readout system which includes a computer, a precise rotary table, a slit, a phase-mismatch adjustor, a light source for readout, a photorefractive crystal (such as doped or doubly doped LiNbO$_3$ or LiTaO$_3$), lenses and CCD. The photorefractive crystal used in the readout system is the one in which the information has been recorded by way of the writing system.

The intersect angle 2 θ of the two writing beam from the lens 106 and mirror 108 is within the range of 10°~35°; the angle between the light from the phase-mismatch adjustor 202 and the diffracted light from the photorefractive crystal 204 to the lens 207 is 180°-2α, the relationship between α and θ is $\lambda_w \sin\theta = \lambda_r \sin\alpha$, where $\lambda_w$ and $\lambda_r$ are the wavelengths of writing light and readout light, respectively.

The spatial light modulator is used to show under the control of a computer the information which will be stored, the photorefractive crystal is fixed onto the precise rotary table which is controlled by the computer to get to any desired angle, and the CCD collects the image to the computer for further processing. The phase-mismatch adjustor is used to compensate for the phase mismatch when the red light is used for read out the stored images, which were recorded by the green light. The phase-mismatch adjustor is an irregular double-convex lens, with the transverse focus length range of 50~400 mm and the longitudinal focus lens range of 300 mm~+∞

The implementation mode of the of the invention is: using the photorefractive crystals (doped or doubly doped LiNbO$_3$ or LiTaO$_3$) as the three-dimensional holographic storage optical disc materials; using the green light (wavelength 532 nm) from the solid-state laser to write the information in the crystal according to the holographic way through the photorefractive effect of the crystals in the transmission configuration; and using the red light (typical wavelength ~670 nm) from the semiconductor laser as the readout beam; where the phase-mismatch adjustor is a specially designed irregular double-convex lens, and the dynamically differential technique is used to encode and decode the computer files.

BRIEF DESCRIPTION OF DRAWINGS

The invention will be illustrated combining following drawings, in which.

Figure 1:
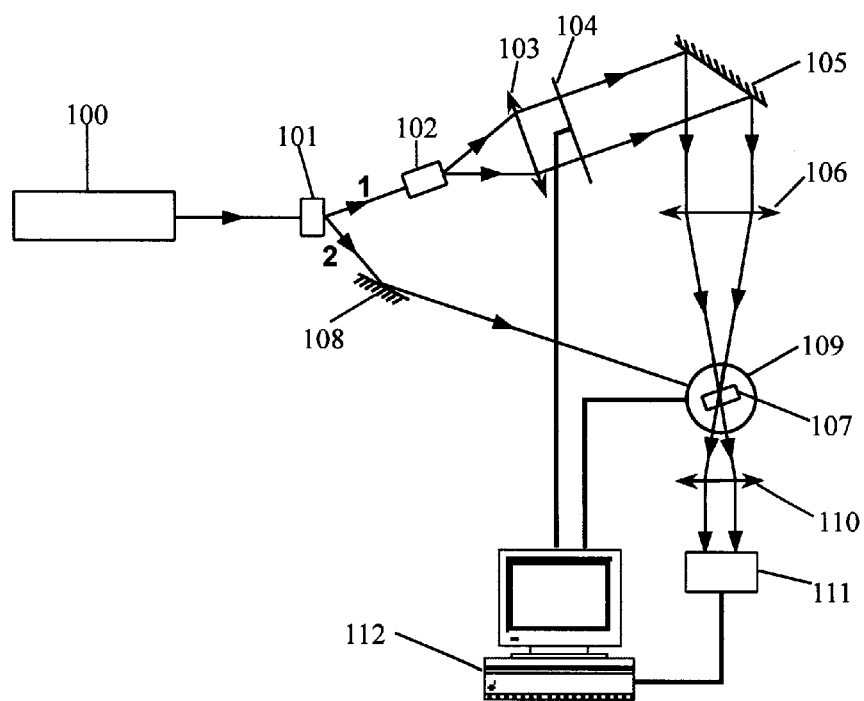
FIG. 1 shows the writing setup.

OPTIMUM REALIZATION OF THE INVENTION (1) Writing Procedure (see FIG. 1):

① A storage file is encoded under the control of a computer 112 to form an encoded two-dimensional pattern, which is output to a spatial light modulator 104, and a coded image or a storage image is formed by way of the spatial light modulator 104; ② A beam of green light from the laser source for green light (wavelength of 532 nm) is divided into two beams through a beam slitter 101; one beam 1 passes through the spatial filter 102 and is collimated by the lens 103 to pass through the spatial light modulator 104 where it is modulated and to carry the information of the encoded image, and then it is reflected by the mirror 105 and is focused by the lens 106 upon the crystal 107; Another beam 2 is reflected by the mirror 108 and incident on the sample crystal 107 as a reference light. Two writing beams interfere in the crystal 107 and record the hologram in the crystal 107. ③ When the holographic recording is finished, the rotary table 109 is rotated to another angle under the control of the computer 112, and the next image storage is started. Repeat the steps mentioned above until the multi-page image could be stored in the sample.

Figure 2:
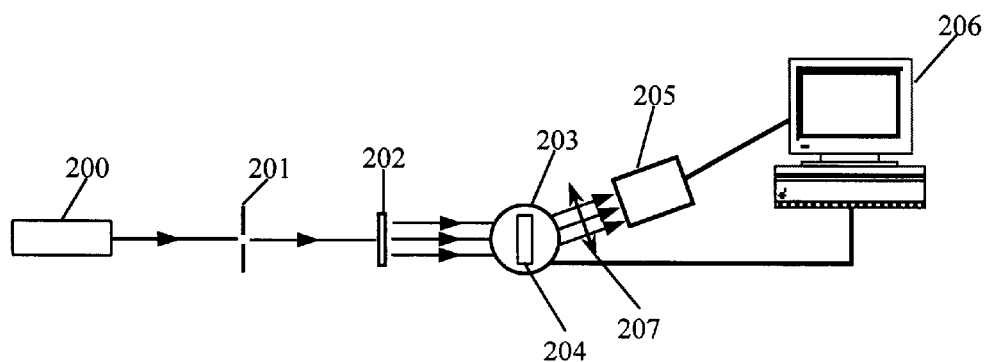
FIG. 2 shows the readout setup.

(2) Readout Procedure (see FIG. 2):

① The sample is rotated to a needed angle by the rotary table 203 controlled by the computer 206, and a red light (wavelength 650–690 nm, typing wavelength 670 nm) from a semiconductor laser 200 works as the read-out light to pass the slit 201 first, and then pass through the phase-mismatch adjustor (i.e. double-convex lens) 202, to be incident on the crystal 204. The diffracted light is collected by the lens 207 and imaged on to CCD 205. The image information detected by the CCD will be decoded to the original computer files by the computer. ② Rotate the rotary table 203 to a needed angle under the control of the computer to rotate the sample to next angle, and get more stored images (files). The photorefractive crystal used in the readout system is the one in which information has been recorded by way of the writing system.

The photorefractive crystals of the invention are doped and doubly doped lithium niobate and $LiTaO_3$, and their composition is as follow:

Doped congruent lithium niobate: Fe 0.02~0.05 wt. %

$LiTaO_3$: Fe 0.02~0.05 wt. %

Doubly doped lithium niobate: Fe 0.007~0.03 wt. %, Mg 1.0~5.5 mol. %

Fe 0.01~0.05 wt. %, In 0.75~3.0 mol. %

Fe 0.02~0.06 wt. %, Zn 1.5~6.5 mol. % and the $[Li]/[Nb]\approx 0.87~0.95$

Industrial Applicability

The storage capacity is represented by PQR in the invention, where P is the storage capacity of one page, P=1 K~10 M bits; Q is the encoded storage hologram number at one localization (in our invention, according so called angle coding way, Q~1000 for the monochrome storage mode, Q~200 for the twin-chrome storage mode); R is the number of the location available in the crystal, R~$20/cm^3$. We have achieved 0.5 Gbits of data storage in a crystal sized 1.2× 1.4×0.45 $mm^3$ of LN: Fe, Mg(Fe0.02 wt. %, Mg 1.0 mol. %). The storage capacity in the crystal is at least as high as 50 $Gbits/cm^3$.

The invention utilizes the transmission configuration in which the green light works as the writing light and the red light works as the readout light. The micro-semiconductor laser is used to make the system much small and more compact, and to make the wavelength of the readout light (650–690 nm, typing wavelength 670 nm) far away from the wavelength of the writing light (532 nm). Furthermore, because of a mismatch of optical vectors, the readout of the written noise is suppressed greatly, the signal-to-noise ratio is further improved, and the reproduction of a high sharpness image is achieved. Additionally, using the irregular double-convex lens as a phase-mismatch adjustor can reproduce the storage images of a large area in a distortionless way. A high-density and high-speed digital storage has been realized by way of the dynamically differential coding and decoding technology, and the bit-error-rate is decreased efficiently (lower than $10^{31\ 6}$). In the mean time, the problem of optically fixing the stored information has been solved to make the three-dimensional optical storage obtain the practical applicability.

What is claimed is:

1. A only-readable three-dimensional optical storage, wherein said storage consists of two systems:

A writing system which includes a computer, a beam splitter, a precise rotary table, a writing light source, lenses, a spatial light modulator, a spatial filter, mirrors, a photorefractive crystal and a CCD; and in which said spatial light modulator (104), precise rotary table (109), CCD (111) are connected to said computer (112); said photorefractive crystal (107) is fixed on said precise rotary table (109); said beam splitter (101) is placed in the front of said writing light source (100), and said spatial filter (102), lens (103), spatial light modulator (104) is placed in turn between said beam splitter (101) and said mirror (105); said mirror (108) is placed between said beam splitter (101) and said photorefractive crystal (107); said lens (106) is placed between said beam splitter (101) and said photorefractive crystal (107); and said lens (110) and said CCD (111) is in turn placed behind said photorefractive crystal (107) and opposite to the lens (106), with a intersect angle 2θ of two writing beam from the lens (106) and mirror (108) being within the range of 10°~35°;

a read-out system which includes a computer, a precise rotary table, a slit, a phase-mismatch adjustor, a readout light source, a photorefractive crystal, lenses and a CCD; in which said precise rotary table (203) and CCD (205) are connected to said computer (206); said photorefractive crystal (204) is fixed on said precise rotary table (203), and said slit (201), phase-mismatch adjustor (202), precise rotary table (203), photorefractive crystal (204), lens (207) and CCD (205) are in turn placed behind the readout light source (200), with a angle (180°-2α) between the light from the phase-mismatch adjustor (202) and the diffracted light to the lens (207) being a function of θ as $\lambda_w \sin\theta = \lambda_r \sin\alpha$.

2. A only-readable three-dimensional optical storage according to claim 1, wherein said phase-mismatch adjustor (202) is an irregular double-convex lens, with the transverse focus length range of 50~400 mm and the longitudinal focus lens range of 300 mm~+∞.

3. A only-readable three-dimensional optical storage according to claim 1, wherein one of the mirrors (105) and (108) can be selectively used, or a plurality of mirrors can be used.

4. An only-readable three-dimensional optical storage according to claim 1, wherein said photorefractive crystals are doped and doubly doped lithium niobate and $LiTaO_3$, and their composition is as follow:

Doped congruent lithium niobate: Fe 0.02~0.05 wt. %

$LiTaO_3$: Fe 0.02~0.05 wt. %

Doubly doped lithium niobate: Fe 0.007~0.03 wt. %, Mg 1.0~5.5 mol. %; Fe 0.01~0.05 wt. %, In 0.75~3.0 mol. %; Fe 0.02~0.06 wt. %, Zn 1.5~6.5 mol. %;

and the $[Li]/[Nb]=0.87~0.95$.

5. A only-readable three-dimensional optical storage process, wherein said process include a writing procedure and a read-out procedure, Said writing procedure includes following steps:

(1) A storage file being encoded under the control of a computer to form an encoded two-dimensional pattern, which is output to a spatial light modulator (104), and a coded image or a storage image is formed by way of the spatial light modulator (104);

(2) A beam of green light from the laser source for green light being divided into two beams through a beam slitter (101); one beam 1 passing through the spatial filter (102) and being collimated by the lens (103) to pass through the spatial light modulator (104) where it is modulated and to carry the information of the encoded image, and then it being reflected by the mirror (105) and is focused by the lens (106) upon the crystal (107); another beam 2 is reflected by the mirror (108) and incident on the sample crystal (107) as a reference light; two writing beams interfering in the crystal (107) and recording the hologram in the crystal (107.);

(3) After the holographic recording is finished, the rotary table (109) being rotated to another angle, and the next image storage being started, (4) Repeat the steps (1)–(3) mentioned above until the multi-page image could be stored;

Said readout procedure includes following steps:

(1) The sample being rotated to a needed angle by the rotary table controlled by a computer, and using a red light from the semiconductor laser as the read out light to pass the slit (201) first, and then through the phase-mismatch adjustor (202), to be incident on the crystal; the diffracted light being collected by the lens (207) and imaged on to CCD; the image information detected by the CCD being decoded to the original computer files by the computer;

(2) Rotating the sample to next angle, and obtaining more stored images.

6. A only-readable three-dimensional optical storage process according to the claim 5, wherein said green light have a wavelength of 532 nm.

* * * * *